Jan. 4, 1949.     L. DE FOREST     2,457,981
CATHODE BEAM TUBE
Filed Nov. 24, 1944     2 Sheets-Sheet 1
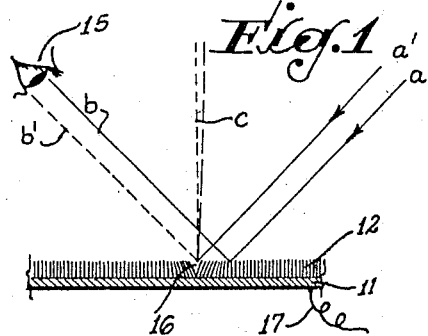
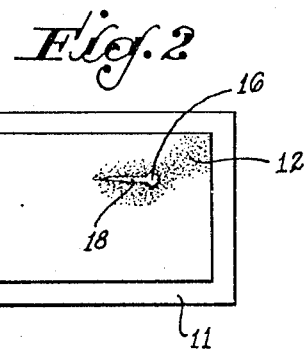
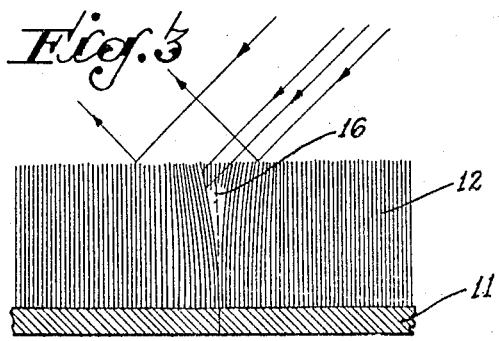
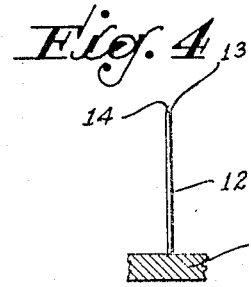
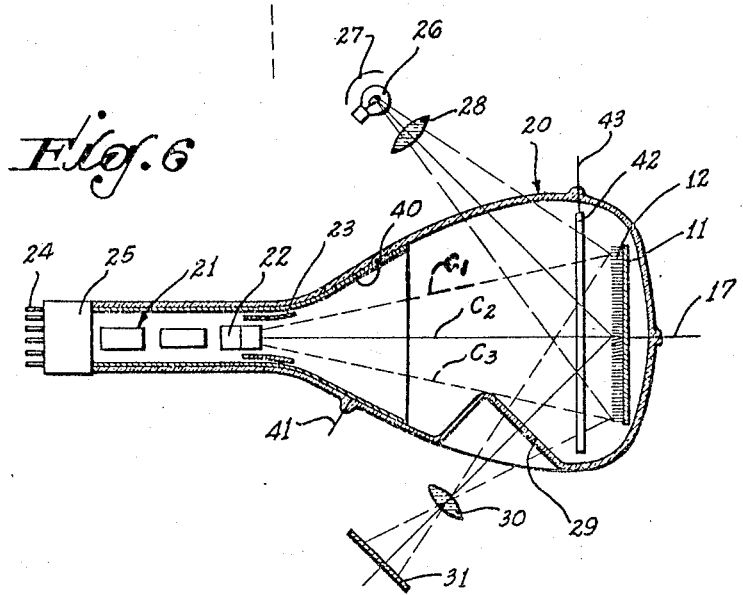
INVENTOR
LEE DE FOREST
BY HARRIS, KIECH, FOSTER & HARRIS
FOR THE FIRM
ATTORNEYS

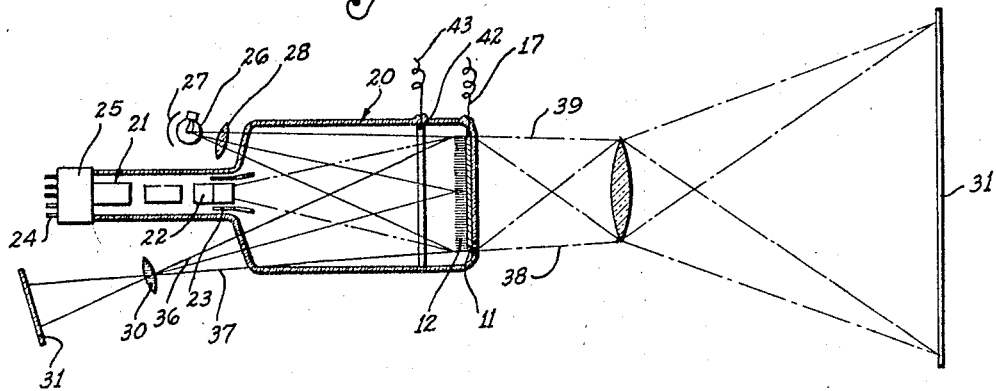
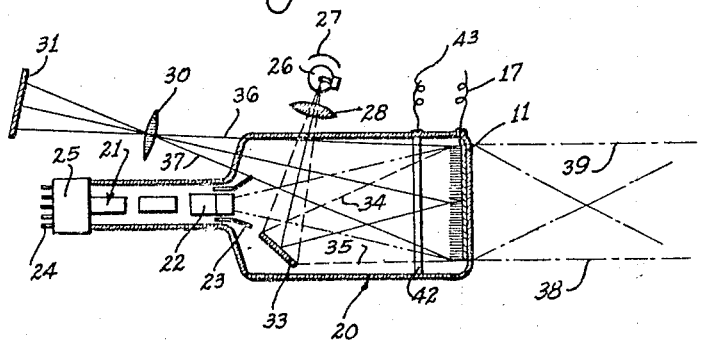

Patented Jan. 4, 1949

2,457,981

UNITED STATES PATENT OFFICE 2,457,981

CATHODE BEAM TUBE

Lee de Forest, Los Angeles, Calif.

Application November 24, 1944, Serial No. 564,973

3 Claims. (Cl. 250—164)

My invention relates to improvements in cathode beam tubes used for television picture reception, and, since it is of particular utility in connection with cathode beam tubes used for the projection of large size television pictures upon viewing screens, embodiments adapted for such use are hereinafter described.

By the methods and apparatus herein described I am enabled to control by means of the scanning cathode beam the amount of light from an independent source of illumination which is reflected from or transmitted through an area or surface, the light reflecting or transmitting qualifications of which surface or substance are greatly influenced by the impact upon small areas of such surface or substance of the impinging cathode beam.

In the drawings

Fig. 1 is a vertical sectional view partially diagrammatic of a target surface for a cathode beam tube embodying my invention;

Fig. 2 is a top plan view of the target surface illustrated in Fig. 1;

Fig. 3 is an enlarged fragmentary vertical sectional view of the target surface illustrated in Fig. 1;

Fig. 4 is an enlarged fragmentary elevational view of one of the fibrous members of the target surface illustrated in Fig. 1;

Fig. 5 is a top plan view of the fibrous member illustrated in Fig. 4;

Fig. 6 is an elevational view partially diagrammatic of a cathode beam tube and optical system embodying one form of my invention;

Fig. 7 is an elevational view partially diagrammatic of a cathode beam tube and optical system embodying another form of my invention; and Fig. 8 is an elevational view partially diagrammatic of a cathode beam tube and optical system embodying still another form of my invention.

I will first describe an embodiment of my invention in which the surface structure is such that the projected light from a permanent source of illumination directed through an appropriate optical system is brightly reflected from such surface except at a point where the cathode beam is impinging or at the points which have been immediately before visited by the travelling cathode beam.

Referring to the drawings, which are for illustrative purposes only, the numeral 11 indicates a plate which either is of metallic conducting material or is of dielectric material provided with an upper surface coating of conducting and light-transparent material, such, for example, as a thin coating of silver deposited by the well known splutter process. Secured as by cementing to the upper surface of the plate 11 is a large number of straight short vertical fibrous members 12.

The fibrous members 12 are all of the same length so that their upper ends or surfaces 13 lie in the same plane, and each of the fibrous members 12 is adjacent but spaced a short distance from its neighbors. The upper end 13 of each of the fibrous members 12 is plane surfaced and rendered highly light-reflective by the deposit thereon of a coating 14 of suitable reflecting material, such, for example, as silver, magnesium, or aluminum. The fibrous members 12 may be formed of any of a variety of materials, preferably highly resistant to the passage of electric current and yet not completely non-conductive. I have used for such fibrous members 12 spun glass and quartz, but satisfactory results are obtained also if such fibrous members 12 be formed of fabric, such as the nap of velvet or velour.

A satisfactory method for constructing a target surface of such fabric involves the use of fibres woven into a fabric base exactly as in the process employed in the manufacture of long-ply velvet. The surface of such fabric, after the usual cutting process, may be lightly pressed upon the upper surface of the plate 11, over which a thin layer of suitable cement, such as vinolyte, has been spread. After the ends of the fibres of the velvet fabric have become cemented to the surface of the plate 11, the fabric base of the material may be cut away by means of any suitable sharp tool, leaving the upper ends of the fibres free and the fibres all of exactly the same height or length so that the upper free ends of the fibres are plane surfaced and parallel to the surface of the plate 11.

In accordance with my invention, the entire assemblage of plate 11 and fibrous members 12 is then placed in a suitable container which is highly exhausted, and the coating 14 of the desired metal, for example, silver, is deposited by the spluttering process upon the upper surfaces or ends 13 of the fibrous members 12. This method of establishing a mirror surface upon the upper end 13 of each individual fibrous member 12 leaves the fibrous members 12 unattached to each other and their upper ends 13 free to move in directions substantially parallel to the plate 11, each fibrous member 12 being separated from its neighbors a sufficient distance to permit such movement.

The diameter of each fibrous member 12 is preferably of the order of .001 inch or less, and the length of each, while not critical, is preferably of the order of ⅛ to 1/16 of an inch. The distance separating each fibrous member 12 from its neighbor is approximately of the same order as its diameter.

If the material of which the fibrous members 12 are formed is glass or some non-conducting material, it is necessary to render the surfaces on the side walls of each of the fibrous members 12 conducting to a limited degree. This may be accomplished by preliminary exposure of the fibrous material before or after it has been woven into a fabric-like structure to a conducting solution, such as exceedingly dilute acid. Such limited conductivity may be provided to the side walls of the fibrous members 12 also by depositing thereon a very thin coat of a conductor, such as silver or cadmium, by the spluttering process. In the latter method the fibrous members 12 in the fabric-like material are successively bent down in a direction almost parallel with the fabric base so as to expose a row of the fibrous members 12 well separated from the adjacent row of fibrous members for the deposition of the metal upon the fibrous members so exposed.

The straight edge, which may be employed to so bend down the fibrous members 12, may be slowly moved in a direction thus to expose successive rows of the fibrous members 12 to the metal being deposited until the displacement of and deposition upon the fibrous members 12 have been continued over the entire ply of the fabric-like material in two directions at right angles to each other, so that every fibrous member 12 has been rendered slightly conducting.

The fibrous members 12, instead of being formed of non-conducting material, may be formed of thin highly resistant wire, such as nichrome, having a diameter of the order of .0005 inch or less. Because of the stiffness of the fibrous members 12 if formed of such wire, as compared with the stiffness of the fibrous members 12 when formed of glass or fibre, such as silk, rayon, nylon, or the like, the former should be considerably longer than the latter, for example, of the order of $\frac{3}{8}$ to $\frac{1}{2}$ inch.

It is possible also to form the fibrous members 12 of metal or of plastic by extruding them. Thus, a sheet of metal or of transparent plastic is drilled with the desired number of holes of the order of .001 inch in diameter or less therethrough, the holes being symmetrically arranged in straight lines, and each being separated from its neighbors by distances approximately equal to the diameter of the holes.

Such a perforated plate is inserted in the cavity of a suitable die, and one side of the cavity is filled with the proper amount of metal or of plastic, transparent or opaque, depending upon whether the resulting fibrous members are to be employed for transmitting or reflecting the projected light. Such a plastic, heated to a suitable temperature, is then compressed so that it is extruded evenly through all of the small perforations in the plate until the extruded fibrous members on the opposite side of the plate reach the desired length. After the extruded fibrous members have hardened, the mass on the side of the plate which has not been forced through the perforations is cut away to provide a smooth surface to the plate.

If the fibrous members 12 are to be employed to reflect the light from the projection lamp, the ends of the fibrous members 12 so formed are provided with a reflective coating in the manner hereinbefore described. The supporting plate in such case may be of metal, but, if the fibrous members 12 are to be employed for the control of transmitted light through the surface of the plate separating the fibrous members 12, obviously it is essential that the perforated plate be of a light-transparent material, such as a suitable plastic.

With the fibrous members 12 formed and supported in the manner described, when a beam of projected light is thrown upon the reflecting coating 14 upon the ends 13 of the fibrous members 12, as illustrated in Fig. 4, it is reflected therefrom at the appropriate angle with a high degree of efficiency. This is diagrammatically illustrated in Fig. 1, where $a$—$a'$ indicates two parallel rays of light falling upon the coating 14. The ray $a$, which falls upon the coating 14 on the fibrous members 12 which are in their normal parallel position, is reflected as indicated by the ray $b$, whereas the ray $a'$, which falls upon a portion of the fibrous members 12 which have been displaced or bent away from the vertical, is not thus reflected in the direction shown by the dotted line $b'$ of the diagram, because the reflection of this ray $a'$ becomes diffused and scattered, with the result that the observing eye, located as indicated by the numeral 15, will see the reflected beam $b$ but not the beam reflected from the impinging ray $a'$.

In Fig. 1 the lines indicated by $c$ represent a cathode beam projected from an appropriate cathode beam gun not illustrated in this figure. The beam $c$ of electrons falling upon the coating 14 on the ends 13 of a small number of the fibrous members 12 charges this coating with electrons. The mutual repulsion of the negative charges thereby imparted to the upper ends 13 of these fibrous members 12 impinged by the cathode beam $c$ causes the upper ends 13 of these fibrous members 12 to be repelled from each other, resulting in a V-shaped deformation in the mass of the fibrous members 12, as indicated by the numeral 16 in Figs. 1, 2, and 3.

Because of such displacement of the fibrous members 12 impinged by the cathode beam $c$, to the observing eye the area at the deformation 16 appears as a more or less dark area upon the otherwise brightly illuminated and reflecting surface of the coating 14 on the fibrous members 12 which are not so displaced. The degree of separation or displacement of the fibrous members 12 produced by the impinging cathode beam $c$ is dependent upon the number of electrons deposited upon the coating 14 on such fibrous members 12. This number is determined by the modulation of the cathode beam $c$ by means of the signal impressed upon the control grid of the cathode beam tube. Thereby the degree of impairment of the reflection of the spot upon which the cathode beam falls is determined by the modulated signal. The electrons deposited by the cathode beam $c$ upon the coating 14 on the fibrous members 12 leak off down the shanks or side walls of the fibrous members 12 to the plate 11 which is connected to a source of positive potential by a conductor 17. The negative terminal of such source is connected through appropriate resistances to the cathode of the tube.

After the cathode beam $c$ progresses in its sweep over the reflecting surfaces provided by the coating 14 on the fibrous members 12, the deposited electrons seeping down the side walls of the fibrous members 12 prevent the fibrous members 12 from resuming their original vertical, parallel, and proximate positions immediately after the sweep of the cathode beam $c$ beyond such fibrous members 12. This results in a brief diminishing continuation of the deformation or displacement 18 of the fibrous members 12 caused by the cathode beam $c$ after the sweep of the cathode beam $c$ therepast, which is a desirable feature resulting in a prolonged optical impression upon the retina of the eye, thereby enhancing the signal intelligence over that obtainable if the fibrous members 12 instantaneously resume their original, vertical, and proximate positions immediately after the sweeping of the cathode beam $c$ therepast.

The period of time between the passage of the cathode beam $c$ past each of the fibrous members 12 and the resumption of its original position by each fibrous member is controlled also by the resilience of the fibres and their natural period of vibration. It is important that this period of restoration of the fibrous members 12 be not longer than the time required for the cathode beam $c$ to sweep the entire picture area and come back again to the same spot. This means that with today's accepted television standards this restoration time of the fibrous members 12 should not ordinarily exceed $1/30$ of a second.

Inasmuch as television scanning is over alternate lines in successive picture sweeps, the next successive sweep of the cathode beam $c$ over the line in which lies the areas of deformation 16 and 18 would be separated therefrom by the width of one line of the picture. Therefore, it is not necessary that the fibrous member restoration occur within $1/60$ of a second, for it may consume $1/30$ of a second. No difficulty is experienced in obtaining this period of restoration providing the length, diameter, and resilience of the fibrous members 12 be appropriately chosen.

It is true that with alternate line or interlaced scanning, now standard in television, the deformations 16 and 18 of the fibrous members 12 along an odd line of the scanning may be somewhat impaired by the next succeeding sweep of the cathode beam $c$ along the proximate even line, but in such event the deformation 18 and the resulting distortion image signal may persist for at least $1/60$ of a second with the optical advantages inherent thereto.

Illustrated in Fig. 6 is a cathode beam tube 20 consisting of the conventional transparent vessel highly exhausted. The tube 20 contains the conventional cathode gun 21 including an electron lens 22 and deflecting plates 23, the conducting leads 24 to all of which are brought out through a base 25 of the tube 20. The plate 11 with the fibrous members 12 attached thereto, as previously described, is located within the enlarged end of the cathode beam tube 20 and supported by the conductor 17 which is sealed through the end of the cathode beam tube 20. The numeral 26 indicates a light source mounted in front of a suitable reflector 27 so that light rays therefrom are directed through a projecting lens 28 upon the surface of all of the coatings 14 upon the ends of the fibrous members 12 so that they are all brightly illuminated. The reflected light from the coatings 14 is brought out of the cathode beam tube 20, preferably through a flattened window 29 therein and passes through a projecting lens 30 onto the surface of a distant viewing screen 31. The cathode beam $c$ is illustrated at the top, center, and bottom of its vertical sweep by the lines $c_1$, $c_2$, and $c_3$, respectively.

By such an arrangement, when no signal is received and the cathode beam $c$ is not sweeping over the coatings 14 upon the fibrous members 12, the viewing screen 31 is brightly illuminated over its entire surface. When the video modulated cathode beam $c$ begins to sweep over the coatings 14, the picture will be observed upon the screen 31 in the form of black or gray lines, the degree of blackness of the lines of the picture depending upon the amount of deformation of the reflecting coatings 14 of the fibrous members 12 produced by the modulated sweeping cathode beam $c$. Thus it is possible to obtain relatively large and intensely brilliant television pictures upon the viewing screen 31 without using excessive voltages upon the cathode beam gun 21. High voltages would cause the cathode beam impinging upon the conventional fluorescent area of a projection tube to deteriorate or destroy rapidly the fluorescent material, resulting in an extremely short life of such projection tube.

Inasmuch as the silver or other reflecting material comprising the coating 14 upon the ends of the fibrous members 12 may be relatively thick, there is no observable deterioration of such coating 14 or its reflecting properties by the impingement thereon of cathode beams of very high voltage, and hence the life of the tube hereinbefore described is infinitely increased.

Instead of depending upon reflection of light from the coating 14 upon the ends of the fibrous members 12, as hereinbefore described, my invention may be embodied in a form employing direct light-transmission through the target surface. Apparatus for accomplishing such an operation is illustrated in Fig. 7, where like numbers indicate the parts corresponding to those previously described.

In this apparatus the light source 26, reflector 27, and lens 28 are so disposed relative to the fibrous members 12 that the projected light is thrown upon the fibrous members 12 in a line almost parallel with that of the cathode beam $c$. The light source 26 may, if desired, be actually included within the cathode beam tube 20, although this is not preferred, because of the difficulty encountered in replacing the light source.

For direct light projection or transmission through the fibrous members 12, it is necessary that they be formed of transparent material, such as glass, quartz, or suitable plastic, such as Vinylite or Lucite, and that their lower ends be secured as by a transparent cement to the plate 11 constructed of transparent material. The upper ends 13 of the fibrous members 12 are then left clear and light-transmitting instead of being coated with a light-reflecting coating as described in connection with Fig. 6.

The projected light from the source 26 in the apparatus of Fig. 7 is thus carried directly through the mass of fibrous members 12 with only a small loss involved in such transmission so long as the light beam falls directly or almost directly upon the ends 13 of the fibrous members 12. When, however, the fibrous members 12 are displaced or bent by the impinging cathode beam $c$ to provide the deformations 16 and 18, as illustrated in Figs. 1, 2, and 3, the amount of light transmitted at such areas is very greatly diminished, the diminution in the light transmitted being almost linearly proportional to the amount of deflection of the fibrous members 12 at the deformations 16 and 18, which deflection is in turn determined by the picture modulated cathode beam $c$.

Obviously in the apparatus of Fig. 7 the light from the source 26 projects through the fibrous members 12, and it is desirable that the side walls of the fibrous members 12 be coated so that no light can enter the fibrous members 12 except at the upper ends thereof.

In the embodiment of my invention illustrated in Fig. 8 like numbers indicate parts corresponding to those previously described. In the apparatus so illustrated the projected light beam from the source 26 is by the reflector 27 and the lens 28 directed upon a reflecting mirror 33 positioned within the tube 20 so that the reflected light falls upon the fibrous members 12 with a direction of travel even more nearly perpendicular to the plate 11 as indicated by the lines 34 and 35.

If the fibrous members 12 are provided with the reflecting coating 14, as described in connection with the apparatus illustrated in Fig. 6, light reflected from such coating will be transmitted through the rear end of the tube 20 upon the viewing screen 31 as indicated by lines 36 and 37. The apparatus illustrated in Figs. 7 and 8 are however better adapted for the direct transmission of light axially through the fibrous members 12 having no such coating 14. As described in connection with the apparatus of Fig. 7, this transmitted light passes out of the end of the tube 20, as indicated by lines 38 and 39, and through a suitable projection lens onto the viewing screen.

As indicated by the numeral 40 in Fig. 6, a portion of the interior of the neck and enlarged portion of the tube 20 is coated with a conducting material, preferably aguadag, as is customarily used in cathode beam television tube construction. Metallic connection with this coating 40 is made through the wall of the tube 20 by a conductor 41 which is connected to a source of positive voltage, the negative terminal of which is connected to the cathode of the tube 20. The same type of interior conductive coating is deposited upon the tubes 20 in the apparatus illustrated in Figs. 7 and 8. Openings in this conductive coating are, of course, left for the admission of the projected beam of light and the passage of the reflected beam of light.

The numeral 42 indicates an interior metallic or metallized ring in the tube 20 connected by a conductor 43 to a positive high voltage source. The ring 42, which is included also in the tubes illustrated in Figs. 7 and 8, operates to accelerate further the velocity of the cathode beam and also to a certain degree to collect stray electrons which are reflected from the fibrous members 12 and which may not be collected by the conducting surface 40.

Instead of transmitting the light directly through the transparent fibrous members 12, as previously described, I may employ fibrous members formed of opaque material mounted upon a plate 11 of a transparent substance, such as glass or Lucite, rendered partially conducting, as hereinbefore described. In such construction the projected light is transmitted directly through the transparent plate 11 wherever the fibrous members 12 have been displaced from one another to provide the deformations 16 and 18 by the impinging cathode beam c. In such construction, when the free ends 13 of the fibrous members 12 are displaced relative to each other, light of the incident beam is admitted to the transparent plate 11 at the base of the fibrous members 12. In the operation of such apparatus the electron beam serves to admit light or larger quantities of light to the transparent base plate, so that the observed picture thereby obtained is the reverse or complement of the picture which is obtained when the fibrous members 12 are themselves transparent and are made to receive less light on their free ends 13 when such ends are displaced by the deformations 16 and 18.

Instead of using the shapes of evacuated vessels shown in Figs. 6, 7, and 8, it is obvious that I may use a type of vessel similar to that of the well known iconoscope or television transmitter cathode beam tube, in which the cylindrical portion of the tube containing the cathode beam gun is set at an angle from the axis of the enlarged portion of the tube in which the fibrous surface is mounted. By this arrangement the cathode beam is made to sweep over the fibrous surface always at an angle instead of having the axis of the gun coincide with the mid-axis normal to the fibrous surface.

By such an arrangement it is evident that it is possible to have the projected light fall directly upon the surface of the fibrous layer and be projected directly therethrough, instead of having said projection therethrough at an angle relative to the normal axis of the fibrous surface.

While the embodiments of my invention hereinbefore described are capable of performing the objects primarily stated, there are various modifications of the inventive concepts hereinbefore described which will occur to those skilled in the art, and my invention is to be understood as not limited to the precise constructions or elements herein shown and described for illustrative purposes. The invention which involves the control of light projected upon a fibrous or divided surface by means of deformation produced thereupon or therein by electrons deposited thereon from a modulated or controlled cathode beam includes all such modifications as come within the scope of the claims which follow.

I claim as my invention:

1. A light valve for a cathode beam projection tube, comprising: a large number of light-transparent, parallel flexible fibres of uniform dimensions; and electronic means adapted for so displacing a portion of said fibres relative to the other of said fibres that the transference of light through said displaced fibres is impaired.

2. In a light valve for a cathode beam projection tube, the combination of: a large number of light-transparent flexible members of uniform dimensions; means so supporting said members in normally parallel and spaced positions that the free end of each of said members may move relative to its neighbors; and electronic means adapted for moving the free ends of selected ones of said members, whereby the passage of light through said selected members is impaired in approximate proportion to such movement.

3. A light valve, including a multitude of flexible, closely-spaced, light-pervious filaments having free ends which are disposed in a common surface, said filaments normally being substantially parallel and being adapted to receive charges so that adjacent of said filaments are repelled by each other and bend to increase the spacing between said free ends thereof when charges of like potential are impressed on said adjacent filaments, whereby the transmission of light through said filaments is impaired.

LEE DE FOREST.

REFERENCES CITED

The following references are of record in the file of this patent:

UNITED STATES PATENTS

| Number | Name | Date |
|---|---|---|
| 2,128,631 | Eaton | Aug. 30, 1938 |
| 1,182,451 | Ploke | Dec. 5, 1939 |
| 2,202,541 | Okolicsanyi | May 28, 1940 |

FOREIGN PATENTS

| Number | Country | Date |
|---|---|---|
| 371,155 | Italy | May 12, 1939 |